United States Patent
Ji et al.

(10) Patent No.: US 9,541,716 B2
(45) Date of Patent: Jan. 10, 2017

(54) INTEGRATED CIRCUIT DEVICE PACKAGES INCLUDING OPTICAL ELEMENTS

(71) Applicant: Samsung Electronics Co., Ltd., Suwon-si (KR)

(72) Inventors: Ho-Chul Ji, Yongin-si (KR); Seung-Hyuk Chang, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 267 days.

(21) Appl. No.: 14/206,258

(22) Filed: Mar. 12, 2014

(65) Prior Publication Data
US 2014/0270632 A1  Sep. 18, 2014

(30) Foreign Application Priority Data
Mar. 12, 2013  (KR) .............. 10-2013-26178

(51) Int. Cl.
*G02B 6/42* (2006.01)

(52) U.S. Cl.
CPC ........... *G02B 6/4206* (2013.01); *G02B 6/4203* (2013.01); *G02B 6/4214* (2013.01)

(58) Field of Classification Search
None
See application file for complete search history.

(56) References Cited

U.S. PATENT DOCUMENTS

| | | | | |
|---|---|---|---|---|
| 5,631,988 A * | 5/1997 | Swirhun | ................ | G02B 6/245 385/89 |
| 6,217,231 B1 * | 4/2001 | Mesaki | .................. | G02B 6/421 385/89 |
| 6,477,290 B1 * | 11/2002 | Wan | ..................... | G02B 6/3582 359/290 |
| 8,026,524 B2 * | 9/2011 | Shum | .................... | H01L 33/385 257/103 |
| 2003/0025962 A1 * | 2/2003 | Nishimura | ......... | G02B 6/12007 398/79 |
| 2003/0147592 A1 * | 8/2003 | Kim | ..................... | G02B 6/4246 385/49 |
| 2004/0028096 A1 * | 2/2004 | Senda | .................. | G02B 6/4204 372/36 |
| 2005/0025435 A1 * | 2/2005 | Miyamae | ............ | G02B 6/4292 385/88 |
| 2007/0223865 A1 * | 9/2007 | Lu | ........................ | G02B 6/4292 385/90 |
| 2008/0013896 A1 * | 1/2008 | Salzberg | ................ | G02B 6/423 385/89 |
| 2011/0069464 A1 | 3/2011 | Joe et al. | | |
| 2011/0134679 A1 | 6/2011 | Suh et al. | | |

FOREIGN PATENT DOCUMENTS

JP  03286575 A  * 12/1991
KR  1020110064691  6/2011

* cited by examiner

*Primary Examiner* — Charlie Y Peng
(74) *Attorney, Agent, or Firm* — Myers Bigel, P.A.

(57) ABSTRACT

Integrated circuit device packages including optical elements are provided. The integrated circuit device package may include an integrated circuit device and a conductive pad on a first surface of the integrated circuit device. The conductive pad may be electrically connected to the integrated circuit device and may be configured to transmit an electrical signal. The integrated circuit device package may also include an optical element in the integrated circuit device and the optical element may be configured to transmit an optical signal through a second surface of the integrated circuit device that is opposite the first surface of the integrated circuit device.

18 Claims, 5 Drawing Sheets

INTEGRATED CIRCUIT DEVICE PACKAGES INCLUDING OPTICAL ELEMENTS

CROSS-REFERENCE TO RELATED APPLICATION

This U.S non-provisional application claims priority under 35 U.S.C §119 to Korean Patent Application No. 10-2013-26178, filed on Mar. 12, 2013, in the Korean Intellectual Property Office (KIPO), the disclosure of which is hereby incorporated by reference in its entirety.

FIELD

The present disclosure generally relates to the field of electronics and, more particularly, to integrated circuit devices.

BACKGROUND

Integrated circuit device packages may input and output an electrical signal and an optical signal. Thus, the integrated circuit device packages may include a pad for inputting and outputting the electrical signal and an optical element for inputting and outputting the optical signal. An additional interposer, for example an optical substrate, may be included in the integrated circuit device packages to increase speed of inputting and outputting of the optical signal.

SUMMARY

An optical package may include a semiconductor chip including a first surface on which a pad configured to transmit an electrical signal is arranged, and a second surface opposite the first surface. The optical package may also include a conductive bump electrically connected to the pad and protruding away from the first surface of the semiconductor chip and an optical element in the semiconductor chip configured to input and/or output an optical signal through the second surface of the semiconductor chip. The optical package may further include an optical fiber module configured to transmit an optical signal to the optical element through the second surface of the semiconductor chip.

In various example embodiments, the semiconductor chip may include a reflective layer on the first surface that is configured to reflect the optical signal toward the optical element. The reflective layer and the pad may be formed concurrently such that the reflective layer and the pad may include a material.

In various example embodiments, the semiconductor chip may include a fixing groove on the second surface configured to detachably fix the optical fiber module in the fixing groove.

According to various example embodiments, the optical package may additionally include a micro-lens on the second surface of the semiconductor chip that is configured to concentrate the optical signal.

In various example embodiments, the semiconductor chip may include a receiving groove on the second surface and the micro-lens may be disposed in the receiving groove. The receiving groove may have a first width that is less than a second width of the optical fiber module, and the optical fiber module may contact the second surface of the semiconductor chip.

According to various example embodiments, the optical package may additionally include a molding member surrounding the semiconductor chip. The molding member may include a window exposing a portion of the second surface of the semiconductor chip. In various example embodiments, the optical package may include a reflective index matching material in the window.

In various example embodiments, the window may have a first width that is less than a second width of the optical fiber module, and the optical fiber module may contact the second surface of the semiconductor chip.

In various example embodiments, the window may have a first width that is greater than a second width of the optical fiber module, and the optical fiber module may contact the molding member.

In various example embodiments, the molding member may include an aligning groove, and the optical fiber module may include an aligning key inserted into the aligning groove.

According to various example embodiments, the semiconductor chip may further include an insulating layer extending between the optical element and the optical fiber module. The insulating layer may have a first width that is substantially the same as a second width of the semiconductor chip.

According to various example embodiments, the semiconductor chip may further include an insulating layer only locally disposed between the optical element and the optical fiber module.

In various example embodiments, the optical package may additionally include a package substrate on which the conductive bump is mounted.

An integrated circuit device package may include an integrated circuit device and a conductive pad on a first surface of the integrated circuit device. The conductive pad may be electrically connected to the integrated circuit device and may be configured to transmit an electrical signal. The integrated circuit device package may also include an optical element in the integrated circuit device and the optical element may be configured to transmit an optical signal through a second surface of the integrated circuit device that is opposite the first surface of the integrated circuit device.

In various example embodiments, the integrated circuit device package may further include a reflective layer on the first surface of the integrated circuit device. The reflective layer may be aligned along a path defined by the optical signal and may include a material included in the conductive pad.

In various example embodiments, the integrated circuit device package may further include a groove on the second surface of the integrated circuit device. The groove may be aligned along a path defined by the optical signal.

According to various example embodiments, the integrated circuit device package may include a first groove that is configured to receive an optical fiber module and a second groove on the second surface of the integrated circuit device adjacent the first groove. The second groove may be configured to receive an alignment key of the optical fiber module.

According to various example embodiments, the integrated circuit device package may further include a micro-lens within the groove. The micro-lens may be configured to concentrate the optical signal.

DETAILED DESCRIPTION

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present inventive concept.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, operations, elements, components, and/or groups thereof.

Example embodiments are described herein with reference to cross-sectional illustrations that are schematic illustrations of idealized example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. Further, the regions illustrated in the figures are schematic in nature and their shapes are not intended to illustrate the actual shape of a region of a device and are not intended to limit the scope of the present inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Hereinafter, example embodiments will be explained in detail with reference to the accompanying drawings.

Figure 1:
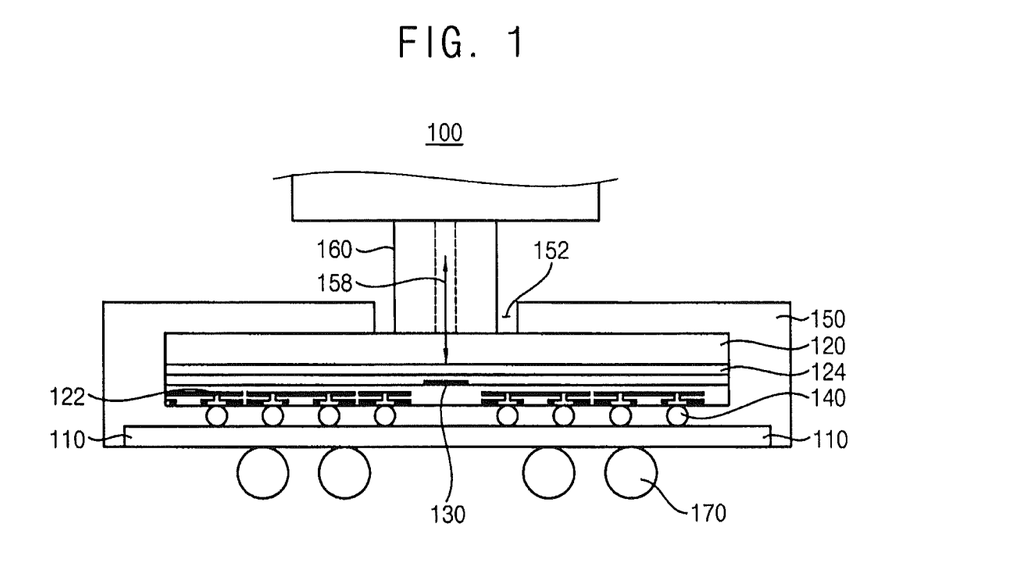
FIGS. 1 through 10 are cross-sectional views illustrating an integrated circuit device package according to example embodiments of the present inventive concept.

FIG. 1 is a cross-sectional view illustrating an integrated circuit device package according to example embodiments of the present inventive concept. Since integrated circuit device packages according to example embodiments include optical elements, those are referred as optical packages.

Referring to FIG. 1, an optical package 100 according to example embodiments may include a package substrate 110, a semiconductor chip 120, an optical element 130, conductive bumps 140, a molding member 150, an optical fiber module 160 and external terminals 170.

The package substrate 110 may include an insulating substrate and a circuit pattern formed in the insulating substrate. The circuit pattern may have an upper end exposed through an upper surface of the package substrate 110, and a lower end exposed through a lower surface of the package substrate 110.

The semiconductor chip 120 may be disposed on the upper surface of the package substrate 110. In example embodiments, the semiconductor chip 120 may have a first surface and a second surface opposite the first surface. The first surface may be a lower surface of the semiconductor chip 120 facing the package substrate 110. The second surface may be an upper surface of the semiconductor chip 120.

In example embodiments, the semiconductor chip 120 may be manufactured using a silicon-on-insulator (SOI) substrate. Thus, the semiconductor chip 120 may include an insulating layer 124. The insulating layer 124 may extend parallel to the first and second surfaces of the semiconductor chip 120. The insulating layer 124 may have a width substantially the same as a width of the semiconductor chip 120.

In example embodiments, pads 122 may be arranged on the first surface of the semiconductor chip 120. The pads 122 may be electrically connected to a semiconductor structure formed on the semiconductor chip 120. Thus, an electrical signal from the semiconductor structure may be inputted/outputted through the pads 122.

The optical element 130 may be formed in the semiconductor chip 120. In example embodiments, the optical element 130 may be arranged in a central portion of the semiconductor chip 120 under the insulating layer 124. An optical signal may be inputted/outputted through the optical element 130.

The conductive bumps 140 may be arranged between the semiconductor chip 120 and the package substrate 110. The conductive bumps 140 may be electrically connected to the pads 122 of the semiconductor chip 120 and the upper end of the circuit pattern in the package substrate 110. The electrical signal may be transmitted through the pads 122, the conductive bumps 140 and the circuit pattern. The electrical signal transmitted through the conductive bumps 140 may have a speed relatively faster than that of an electrical signal transmitted through a conductive wire. Therefore, the electrical signal may be rapidly transmitted through the conductive bumps 140. In example embodiments, the conductive bumps 140 may include solder bumps.

The molding member 150 may be formed on the upper surface of the package substrate 110 to surround the semiconductor chip 120. The molding member 150 may cover side surfaces and the second surface of the semiconductor chip 120. The molding member 150 may protect the semiconductor chip 120 from the external environment. The molding member 150 may include an epoxy molding compound (EMC).

In example embodiments, the molding member 150 may have a window 152 exposing the central portion of the second surface of the semiconductor chip 120. That is, the central portion of the second surface of the semiconductor chip 120 over the optical element 130 may be exposed through the window 152. Thus, an optical path 158 along which the optical signal is transmitted may be formed from the optical element 130 through the window 152. That is, the electrical signal may be inputted/outputted through the first surface of the semiconductor chip 120. In contrast, the optical signal may be inputted/outputted through the second surface of the semiconductor chip 120 opposite the first surface.

The optical fiber module 160 may be inserted into the window 152 of the molding member 150. In example embodiments, the optical fiber module 160 may contact the central portion of the second surface of the semiconductor chip 120 exposed through the window 152. Therefore, the window 152 may have a width greater than that of the optical fiber module 160.

The external terminals 170 may be mounted on the lower surface of the package substrate 110. The external terminals 170 may be electrically connected to the lower end of the circuit pattern. In example embodiments, the external terminals 170 may include solder balls.

Figure 2:
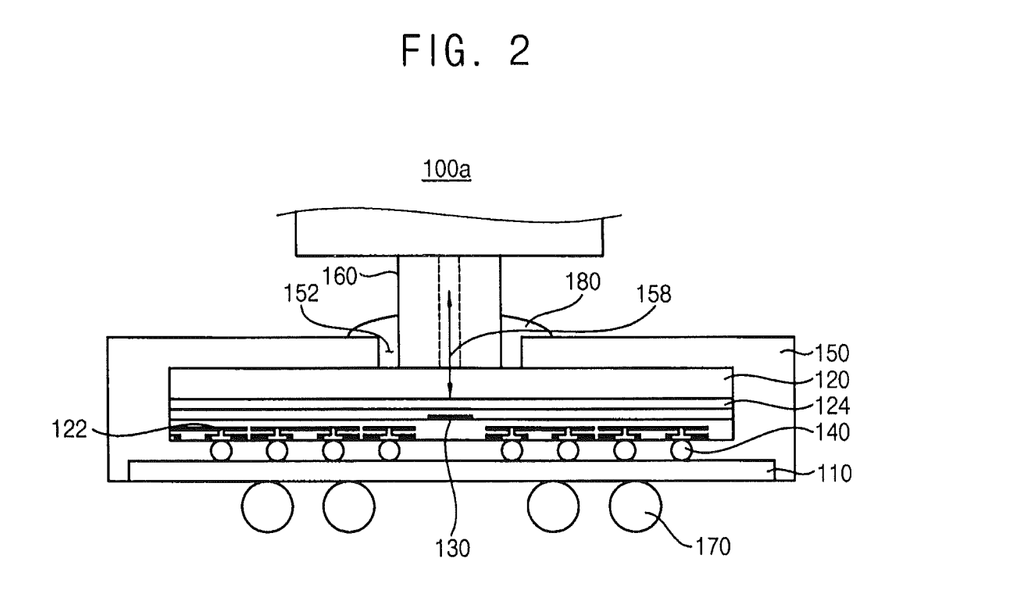

FIG. 2 is a cross-sectional view illustrating an integrated circuit device package according to example embodiments of the present inventive concept. Referring to FIG. 2, an optical package 100a may include elements substantially the same as or similar to those of the optical package 100 in FIG. 1.

The optical package 100a may further include an index matching material 180. The index matching material 180 may be formed in the window 152 of the molding member 150. In example embodiments, the index matching material 180 may include a reflective material.

In example embodiments, the index matching material 180 may restrict minute movement of the optical fiber module 160 in the window 152. Thus, the optical fiber module 160 may be accurately disposed at a desired position. Further, the index matching material 180 may reflect light to the optical fiber module 160. Thus, an optical coupling efficiency between the optical element 130 and the optical fiber module 160 may be improved.

Figure 3:
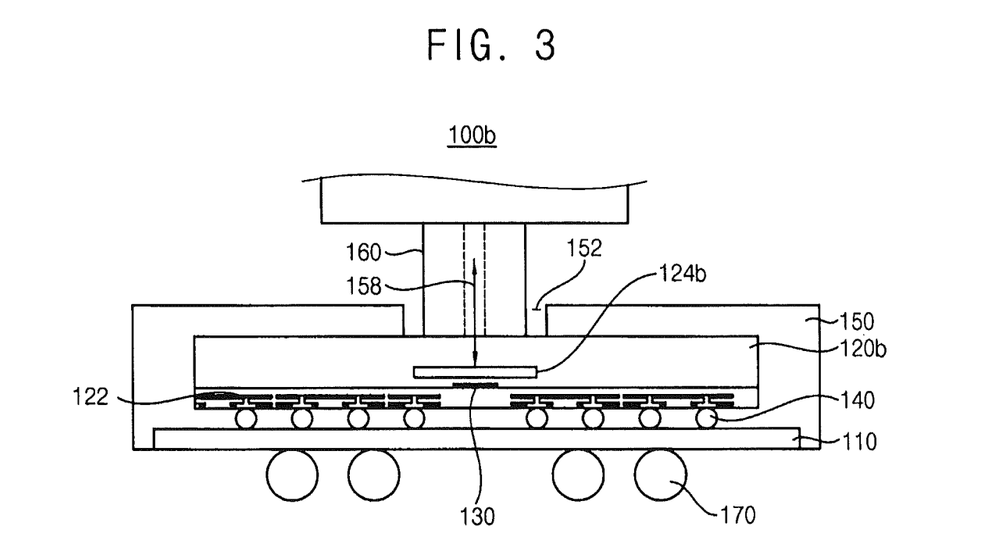

FIG. 3 is a cross-sectional view illustrating an integrated circuit device package according to example embodiments of the present inventive concept. Referring to FIG. 3, an optical package 100b may include elements substantially the same as or similar to those of the optical package 100 in FIG. 1.

A semiconductor chip 120b included in the optical package 100b may include an insulating layer pattern 124b. In example embodiments, the insulating layer pattern 124b may be locally disposed between the optical element 130 and the optical fiber module 160 and may be aligned along the optical path 158. That is, the semiconductor chip 120b may be manufactured using a bulk silicon substrate.

Additionally, the index matching material 180 in FIG. 2 may be formed in the window 152 of the molding member 150.

Figure 4:
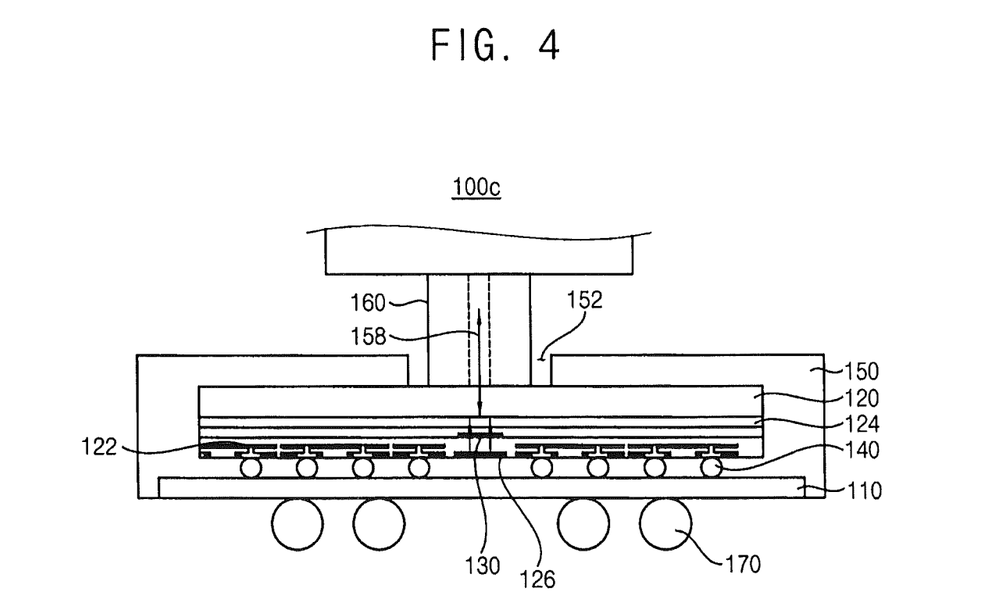

FIG. 4 is a cross-sectional view illustrating an integrated circuit device package according to example embodiments of the present inventive concept. Referring to FIG. 4, an optical package 100c may include elements substantially the same as or similar to those of the optical package 100 in FIG. 1.

The optical package 100c may further include a reflective layer 126. The reflective layer 126 may be arranged at the central portion of the first surface of the semiconductor chip 120 and may be aligned along the optical path 158. The reflective layer 126 may reflect light toward the optical element 130 to improve the optical coupling efficiency.

In example embodiments, the reflective layer 126 may include a metal layer. The reflective layer 126 may include a material substantially the same as or similar to that of the pad 122. Thus, the reflective layer 126 and the pad 122 may be formed concurrently using a process without an additional process for forming the reflective layer 126. For example, the metal layer may be formed on the first surface of the semiconductor chip 120 and then the metal layer may be patterned to form the pad 122 and the reflective layer 126 concurrently.

Additionally, the index matching material 180 in FIG. 2 may be formed in the window 152 of the molding member 150.

Figure 5:
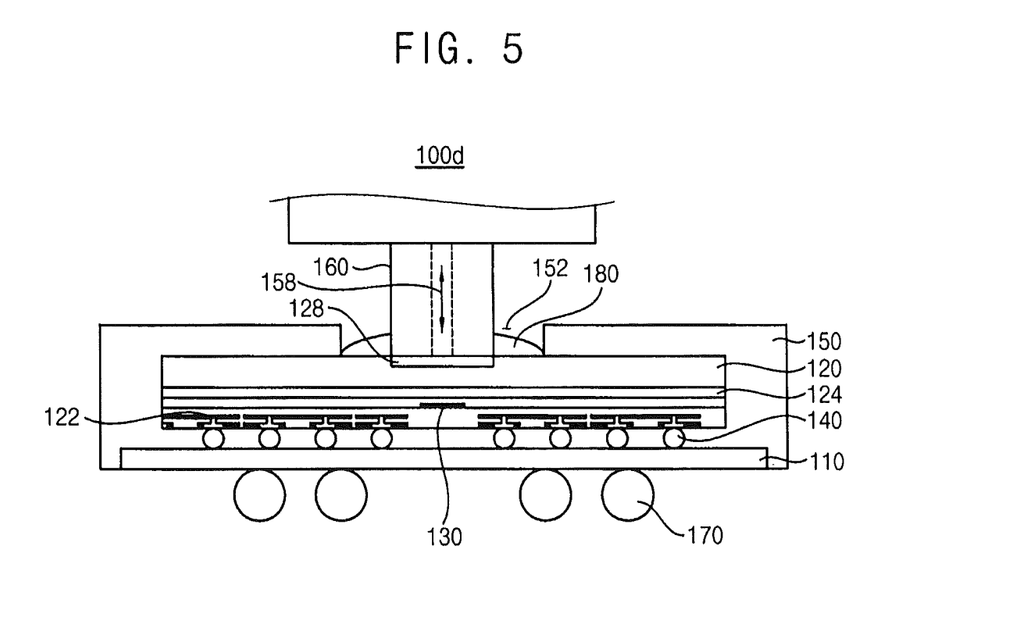

FIG. 5 is a cross-sectional view illustrating an integrated circuit device package according to example embodiments of the present inventive concept. Referring to FIG. 5, an optical package 100d may include elements substantially the same as or similar to those of the optical package 100a in FIG. 2.

A semiconductor chip 120 included in the optical package 100d may further include a fixing groove 128. The fixing groove 128 may be formed at the central portion of the second surface of the semiconductor chip 120. The optical fiber module 160 may be detachably inserted into the fixing groove 128. A position of the optical fiber module 160 may be fixed by the fixing groove 128 so that the optical coupling efficiency between the optical fiber module 160 and the optical element 130 may be improved.

In example embodiments, the fixing groove 128 may be formed by etching the second surface of the semiconductor chip 120. The fixing groove 128 may or may not expose the insulating layer 124 according to a depth of the fixing groove 128. A bottom surface of the fixing groove 128 may not expose the insulating layer 124. Alternatively, the fixing groove 128 may expose the insulating layer 124.

Figure 6:
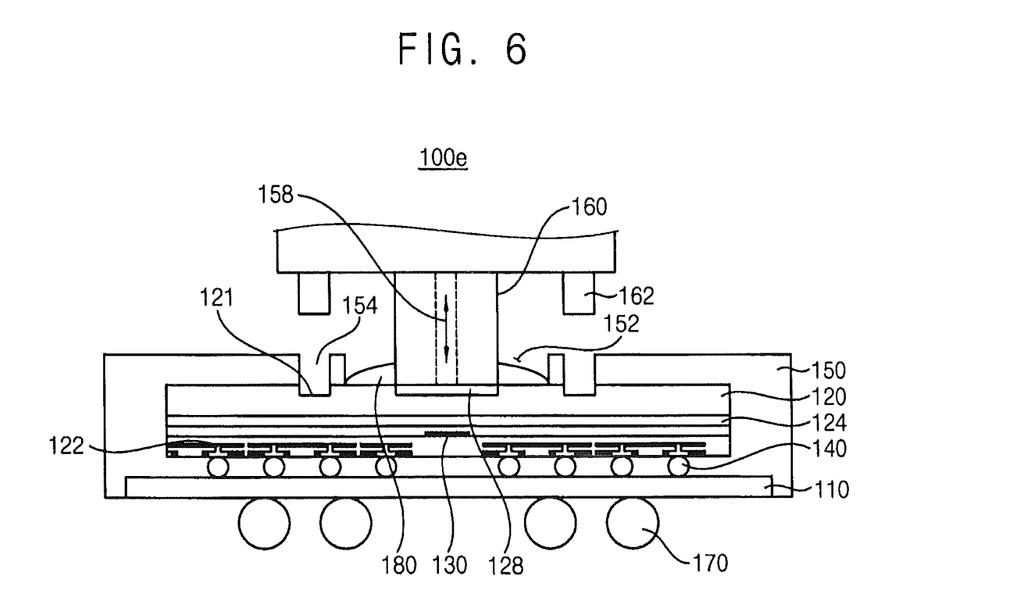

FIG. 6 is a cross-sectional view illustrating an integrated circuit device package according to example embodiments of the present inventive concept. Referring to FIG. 6, an optical package 100e may include elements substantially the same as or similar to those of the optical package 100a in FIG. 2.

An optical fiber module 160 included in the optical package 100e may have an aligning key 162. In example embodiments, the aligning key 162 may include a pair of keys arranged at both sides of the optical fiber module 160.

The molding member 150 may have a first aligning groove 154 into which the, aligning key 162 may be inserted. Further, a second aligning groove 121 in fluidic communication with the first aligning groove 154 may be formed at the second surface of the semiconductor chip 120. Alternatively, in example embodiments, only the first aligning groove 154 may be formed at the molding member 150.

The optical fiber module 160 may be disposed at a desired position by inserting the aligning key 162 into the first and/or second aligning grooves 154 and 121. Thus, the optical coupling efficiency between the optical fiber module 160 and the optical element 130 may be improved.

Figure 7:
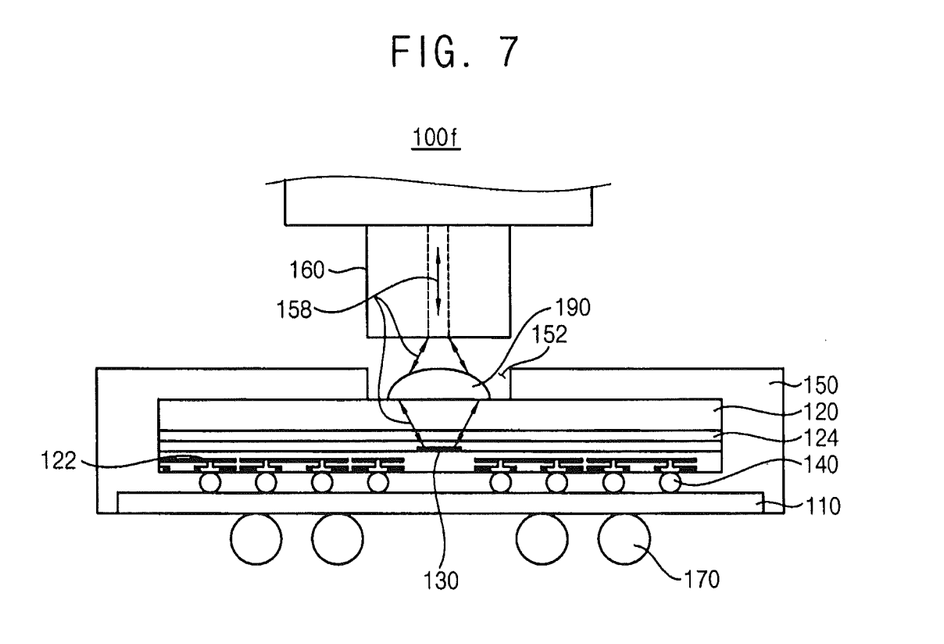

FIG. 7 is a cross-sectional view illustrating an integrated circuit device package according to example embodiments of the present inventive concept. Referring to FIG. 7, an optical package 100f may include elements substantially the same as or similar to those of the optical package 100 in FIG. 1.

The optical package 100f may further include a micro-lens 190. The micro-lens 190 may be disposed at the central portion of the second surface of the semiconductor chip 120. The micro-lens 190 may be exposed through the window 152 of the molding member 150. The micro-lens 190 may concentrate light onto the optical element 130 and the optical fiber module 160 to improve the optical coupling efficiency between the optical element 130 and the optical fiber module 160. Additionally, a transparent cover may be provided in the window 152 to reduce particles, which infiltrate into the micro-lens 190. A size of the micro-lens 190 may be adjusted according to a surface area of the second surface of the semiconductor chip 120 exposed by the window 152.

In example embodiments, the optical fiber module 160 may be spaced apart from an upper surface of the molding member 150. In this case, the aligning key 162 in FIG. 6 may be formed at the optical fiber module 160 and the aligning groove 154 in FIG. 6 may be formed at the molding member 150.

Figure 8:
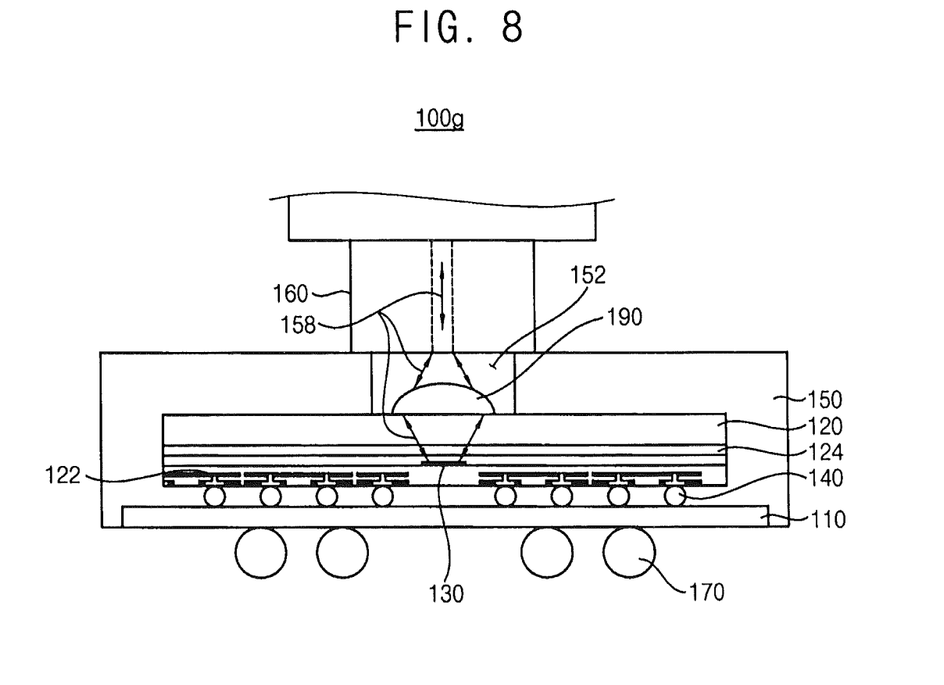

FIG. 8 is a cross-sectional view illustrating an integrated circuit device package according to example embodiments of the present inventive concept. Referring to FIG. 8, an optical package 100g may include elements substantially the same as or similar to those of the optical package 100f in FIG. 7.

The optical fiber module 160 of the optical package 100g may contact the upper surface of the molding member 150. Thus, the window 152 of the molding member 150 may have a width less than that of the optical fiber module 160.

Figure 9:
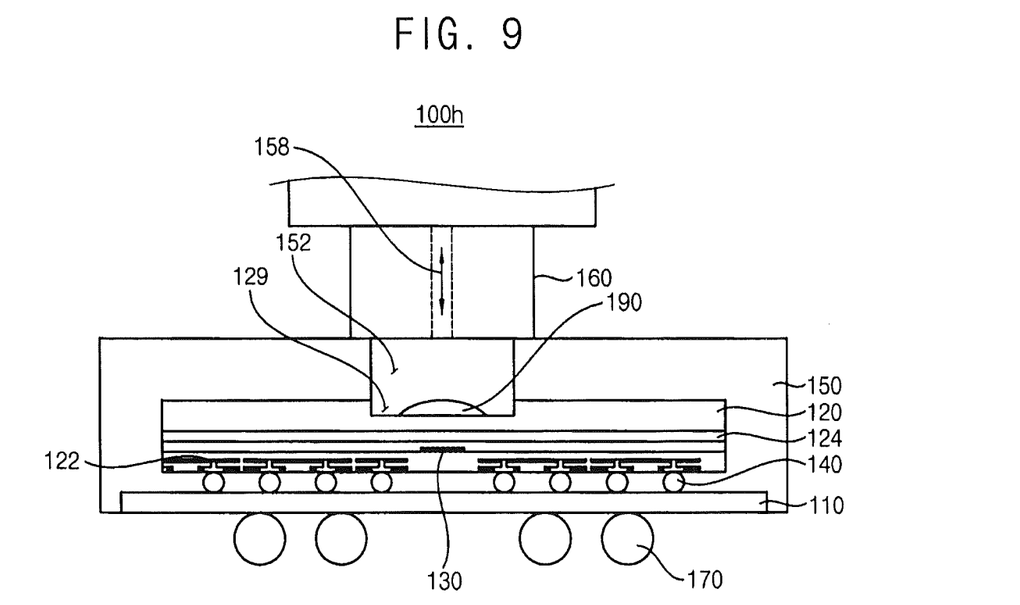

FIG. 9 is a cross-sectional view illustrating an integrated circuit device package according to example embodiments of the present inventive concept. Referring to FIG. 9, an optical package 100h may include elements substantially the same as or similar to those of the optical package 100g in FIG. 8.

The semiconductor chip 120 included in the optical package 100h may have a receiving groove 129. The receiving groove 129 may be formed at the central portion of the second surface of the semiconductor chip 120. The micro-lens 190 may be disposed in the receiving groove 129. A focusing length of the micro-lens 190 may be adjusted according to a depth of the receiving groove 129. In example embodiments, the receiving groove 129 may have a width substantially the same as or similar to that of the window 152 of the molding member 150.

Figure 10:
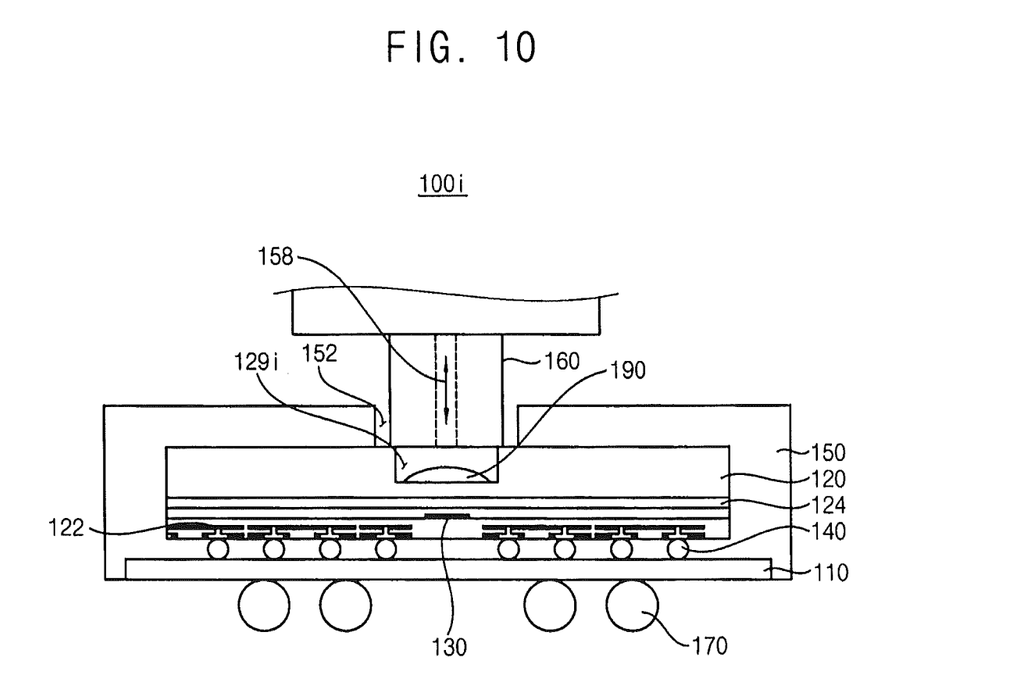

FIG. 10 is a cross-sectional view illustrating an integrated circuit device package according to example embodiments of the present inventive concept. Referring to FIG. 10, an optical package 100i may include elements substantially the same as or similar to those of the optical package 100h in FIG. 9.

The semiconductor chip 120 included in the optical package 100h may have a receiving groove 129i. The receiving groove 129i may have a width less than a width of the window 152 of the molding member 150. Further, the receiving groove 129i may have a width less than the width of the optical fiber module 160. Thus, the optical fiber module 160 may be disposed in the window 152 but the optical fiber module 160 may not be disposed in the receiving groove 129i. As a result, the optical fiber module 160 may contact the second surface of the semiconductor chip 120.

According to example embodiments, the electrical signal may be transmitted through the conductive bump on the first surface of the semiconductor chip so that the electrical signal may be rapidly transmitted. Further, the optical signal may be transmitted through the optical fiber module on the second surface of the semiconductor chip so that the optical signal may be rapidly transmitted without an additional optical transmitting member. Therefore, the optical package may have a small size and may consume low power.

The above-disclosed subject matter is to be considered illustrative, and not restrictive, and the appended claims are intended to cover all such modifications, enhancements, and other embodiments, which fall within the true spirit and scope of the inventive concept. Therefore, it is to be understood that the foregoing detailed description is illustrative of various example embodiments and is not to be construed as limited to the specific example embodiments disclosed, and that modifications to the disclosed example embodiments, as well as other example embodiments, are intended to be included within the scope of the appended claims. Thus, to the maximum extent allowed by law, the scope is to be determined by the broadest permissible interpretation of the following claims and their equivalents, and shall not be restricted or limited by the foregoing detailed description.

What is claimed is:

1. An optical package, comprising:
    a semiconductor chip, the semiconductor chip comprising a first surface on which a pad configured to transmit an electrical signal is arranged and a second surface opposite the first surface;
    a conductive bump electrically connected to the pad and protruding away from the first surface of the semiconductor chip;
    an optical element in the semiconductor chip configured to input and/or output an optical signal through the second surface of the semiconductor chip;
    a molding member extending on sides and the second surface of the semiconductor chip, wherein the molding member comprises a window that exposes a portion of the second surface of the semiconductor chip and overlaps the optical element when viewed from a plan perspective; and
    an optical fiber module configured to transmit an optical signal to the optical element through the second surface of the semiconductor chip, a portion of the optical fiber module being inserted in the window of the molding member, wherein the semiconductor chip further comprises a reflective layer on the first surface that is configured to reflect an optical signal toward the optical element, and wherein the optical element is between the optical fiber module and the reflective layer.

2. The optical package of claim 1, further comprising a reflective material in the window of the molding member.

3. The optical package of claim 1, wherein the optical fiber module contacts the second surface of the semiconductor chip.

4. The optical package of claim 1, wherein the molding member comprises an aligning groove, and the optical fiber module comprises an aligning key inserted into the aligning groove.

5. The optical package of claim 1, wherein the semiconductor chip further comprises an insulating layer extending between the optical element and the optical fiber module, and wherein the insulating layer has a first width that is substantially the same as a second width of the semiconductor chip.

6. The optical package of claim 1, wherein the semiconductor chip further comprises an insulating layer only locally disposed between the optical element and the optical fiber module.

7. The optical package of claim 1, further comprising a package substrate on which the conductive bump is mounted.

8. The optical package of claim 1, wherein the reflective layer comprises a material comprising the pad.

9. The optical package of claim 1, wherein the portion of the second surface of the semiconductor chip exposed by the window of the molding member comprises a fixing groove, and wherein the optical fiber module is detachably fixed in the fixing groove in the second surface of the semiconductor chip.

10. The optical package of claim 2, wherein the optical fiber module extends through the reflective material, and wherein a side of the optical fiber module contacts the reflective material.

11. An optical package, comprising:

a semiconductor chip, the semiconductor chip comprising a first surface on which a pad configured to transmit an electrical signal is arranged and a second surface opposite the first surface;

a conductive bump electrically connected to the pad and protruding away from the first surface of the semiconductor chip;

an optical element in the semiconductor chip configured to input and/or output an optical signal through the second surface of the semiconductor chip;

a molding member extending on sides and the second surface of the semiconductor chip, wherein the molding member comprises a window that exposes a portion of the second surface of the semiconductor chip and overlaps the optical element when viewed from a plan perspective; and an optical fiber module configured to transmit an optical signal to the optical element through the second surface of the semiconductor chip, a portion of the optical fiber module being inserted in the window of the molding member, wherein the portion of the second surface of the semiconductor chip exposed by the window of the molding member comprises a fixing groove, and wherein the optical fiber module is detachably fixed in the fixing groove in the second surface of the semiconductor chip.

12. The optical package of claim 11, further comprising a reflective material in the window of the molding member.

13. The optical package of claim 12, wherein the optical fiber module extends through the reflective material, and wherein a side of the optical fiber module contacts the reflective material.

14. The optical package of claim 11, wherein the window has a first width that is less than a second width of the optical fiber module, and the optical fiber module contacts the second surface of the semiconductor chip.

15. The optical package of claim 11, wherein the molding member comprises an aligning groove, and the optical fiber module comprises an aligning key inserted into the aligning groove.

16. The optical package of claim 11, wherein the semiconductor chip further comprises an insulating layer extending between the optical element and the optical fiber module, and wherein the insulating layer has a first width that is substantially the same as a second width of the semiconductor chip.

17. The optical package of claim 11, wherein the semiconductor chip further comprises an insulating layer only locally disposed between the optical element and the optical fiber module.

18. The optical package of claim 11, further comprising a package substrate on which the conductive bump is mounted.

* * * * *